United States Patent [19]

Shlik

[11] Patent Number: 6,039,472
[45] Date of Patent: Mar. 21, 2000

[54] METHOD FOR MEASURING THE TEMPERATURE OF A METALLURGICAL FURNACE USING AN ACOUSTIC NOISE PARAMETER AND RATE OF CONSUMPTION OF ELECTRICAL POWER

[75] Inventor: Oleg Eduardovich Shlik, Netanya, Israel

[73] Assignee: Accusteel Ltd., D.N., Hefer, Israel

[21] Appl. No.: 09/078,035

[22] Filed: May 13, 1998

[51] Int. Cl.[7] .............................. G01K 11/22; G01K 11/26
[52] U.S. Cl. ............................................ 374/117; 374/118
[58] Field of Search .................................... 374/117, 118, 374/119, 139

[56] References Cited

U.S. PATENT DOCUMENTS 4,317,366  3/1982  Tewes et al. ............................. 374/117

FOREIGN PATENT DOCUMENTS

| 2006007 C1 | 1/1994 | Russian Federation | 374/139 |
| 492759 | 12/1975 | U.S.S.R. | 374/117 |
| WO 93/00577 A1 | 1/1993 | WIPO | 374/177 |

*Primary Examiner*—Diego Gutierrez
*Assistant Examiner*—Stanley J. Pruchnic, Jr.
*Attorney, Agent, or Firm*—Mark M. Friedman

[57] ABSTRACT

A method for measuring the temperature of a metallurgical furnace. An empirical relationship is established that connects the temperature, an operating parameter of the furnace that is causally connected with the generation of acoustic noise, and a representative acoustic noise frequency. Preferably, the relationship is based on modeling the gas phase in the furnace as an ideal gas; the representative frequency is the centroid frequency of the acoustic noise spectrum; and the empirical relationship includes the transformation of the operating parameter into an effective acoustic noise wavelength.

7 Claims, 3 Drawing Sheets

METHOD FOR MEASURING THE TEMPERATURE OF A METALLURGICAL FURNACE USING AN ACOUSTIC NOISE PARAMETER AND RATE OF CONSUMPTION OF ELECTRICAL POWER

FIELD AND BACKGROUND OF THE INVENTION

The present invention relates to metallurgy and, more particularly, to an improved method for measuring the temperature of a metallurgical furnace.

Russian Patent No. 2,006,007, which is incorporated by reference for all purposes as if fully set forth herein, describes a method for measuring the temperature of a metallurgical furnace such as a blast furnace. The acoustic noise spectrum of the furnace is measured. The frequency F of maximum acoustic noise power is determined from the spectrum. The temperature is determined by an equation of the form $$T = \frac{(FL)^2}{KR} \qquad (1)$$

where L is an estimated wavelength of acoustic noise in the furnace, K is the adiabatic exponent of the gas in the furnace, for example, carbon monoxide in a blast oxygen steel furnace, and R is the gas constant. The wavelength L is estimated from the rate of oxygen consumption of the furnace, using an empirical calibration based on explicit measurements of T, F, the rate of oxygen consumption, and parameters, such as the Mach number, of the nozzle used to inject the oxygen.

In practice, it has proven difficult to implement this method, because of the difficulty of picking the frequency of maximum acoustic noise power in real time. FIG. 1 shows a typical acoustic noise spectrum of a blast oxygen steel furnace. The abscissa is frequency, in Hertz, and the ordinate is the output of a digital spectrum analyzer, in millivolts. The ordinate is proportional to the acoustic noise power at each frequency. The portion of the spectrum that corresponds to the noise generated by the injection of oxygen into the furnace is the portion between 300 Hertz and 1400 Hertz. Note that the spectrum is far from a smooth function of frequency. Although, strictly speaking, there is in fact a frequency of maximum power in this range, the position of this maximum changes unpredictably from measurement to measurement in a way that is not reflected in the temperature of the furnace.

FIG. 2 shows an acoustic noise spectrum recorded similarly for an electric arc furnace. In this case, it is impossible to pick a frequency of maximum power.

SUMMARY OF THE INVENTION

According to the present invention there is provided a method of measuring a temperature of a metallurgical furnace, including the steps of: (a) recording an acoustic noise spectrum of the furnace; (b) computing a centroid frequency of the acoustic noise spectrum; and (c) inferring the temperature from the centroid frequency.

According to the present invention there is provided a method of measuring a temperature of a metallurgical furnace, including the steps of: (a) establishing a relationship between a wavelength of acoustic noise in the furnace and a rate of consumption of electrical power by the furnace; (b) simultaneously: (i) recording a spectrum of the acoustic noise, and (ii) measuring the rate of consumption of electrical power; (c) computing a representative frequency of the acoustic noise from the spectrum; and (d) inferring the temperature, based on the representative frequency and on a wavelength inferred from the measured rate of consumption of electrical power using the relationship.

According to the present invention there is provided a method of measuring a temperature of a metallurgical furnace, including the steps of: (a) establishing a relationship between the temperature, a frequency of acoustic noise in the furnace, and a rate of consumption of electrical power by the furnace; (b) simultaneously: (i) recording an acoustic noise spectrum of the furnace, and (ii) measuring the rate of consumption of electrical power; (c) computing a representative frequency of the acoustic noise from the spectrum; and (d) inferring the temperature from the representative frequency and the measured rate of consumption of electrical power, using the relationship.

According to the present invention there is provided a method of measuring a temperature of a melt in a furnace including a source of acoustic noise having a temperature higher than the temperature of the melt, including the steps of: (a) simultaneously: (i) recording a spectrum of the acoustic noise, and (ii) measuring an operating parameter of the source; (b) computing a representative frequency of the spectrum; and (c) inferring the temperature of the melt from the representative frequency and the measured operating parameter.

The present invention is based on the possibility of establishing a relationship between the temperature of the melt in a furnace, a measure of the frequency of the acoustic noise in the furnace, and an operating parameter of the furnace. Equation (1) describes the propagation of sound in an ideal gas as a function of temperature: for a given wavelength, the frequency of the sound varies as the square root of the temperature. As noted above, RU 2,006,007 describes a method for inferring the temperature of the furnace from the frequency of maximum acoustic noise within the furnace and from an effective wavelength determined from the rate of oxygen consumption and from injection nozzle parameters. The present invention extends this method in several innovative ways.

The first innovation of the present invention is the generalization of the measure of frequency of acoustic noise. Surprisingly, it has been found that the centroid frequency of the acoustic noise spectrum provides a stable indication of furnace temperature, even in the case of a spectrum such as the one shown in FIG. 2. Thus, the scope of the present invention includes all suitable measures of acoustic noise frequency.

The second innovation of the present invention is the use of furnace operating parameters, other than the rate of injection of a gas such as oxygen, as proxies for wavelength in Equation (1). In particular, in the case of an electric arc furnace, in which the acoustic noise is generated by the interaction of the plasma arc with the melt, the rate of consumption of electrical power is used as the proxy for wavelength. It should be noted that, unlike a blast oxygen furnace, in which the source of the acoustic noise, the injected oxygen, is at a temperature lower than the melt temperature, in an electric arc furnace, the plasma which acts as the source of the acoustic noise is at a temperature higher than the temperature of the melt.

Finally, and most generally, the scope of the present invention includes the measurement of the temperature of a furnace based on any empirical correlation among temperature, acoustic noise frequency and an operating parameter of the furnace. This empirical correlation need not take the form of Equation (1), which merely suggests the possibility of such a relationship.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an improved non-contact method for measuring the temperature of a metallurgical furnace.

Figure 1:
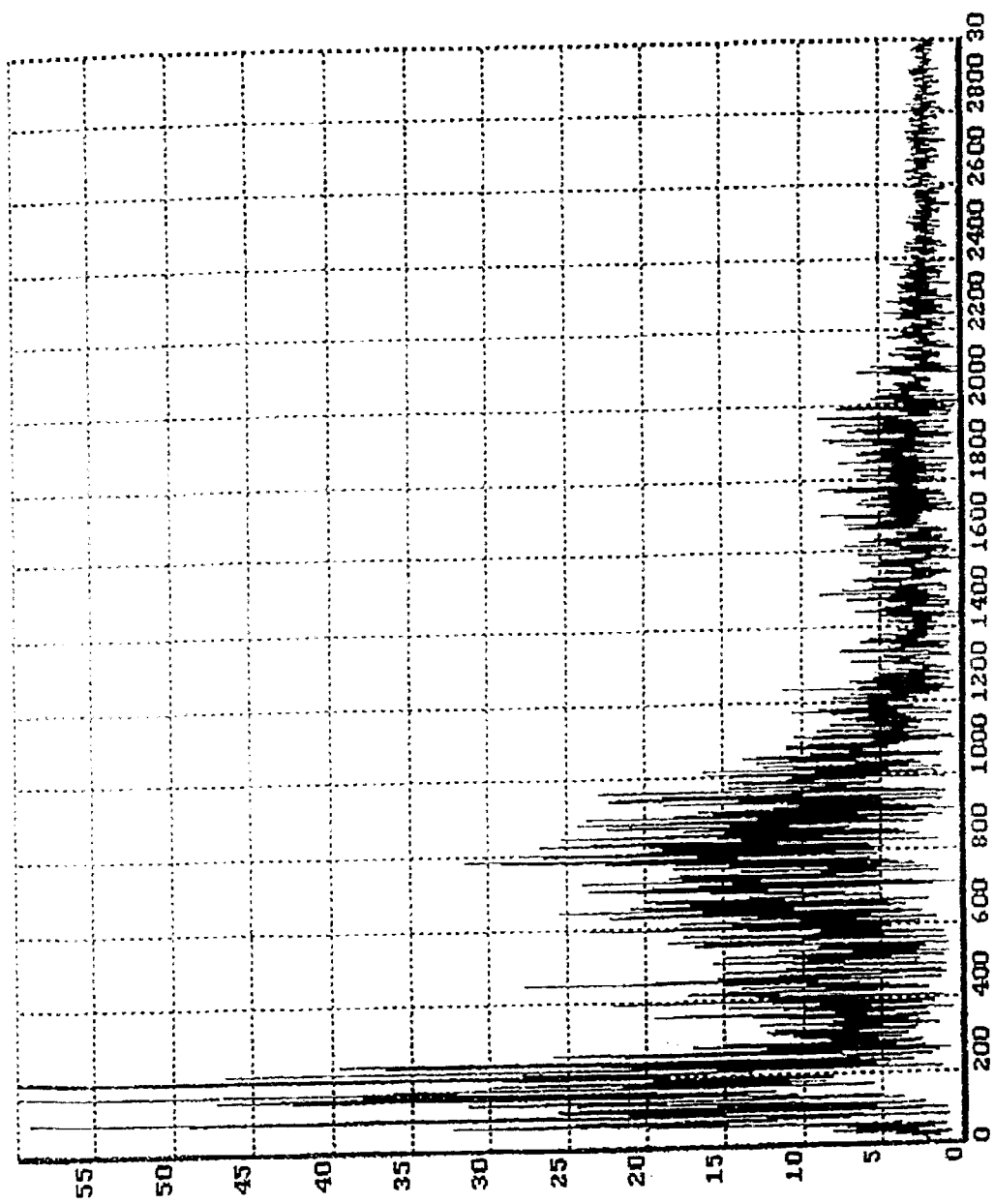
FIG. 1 is an acoustic noise spectrum of a blast oxygen steel furnace.
Figure 2:
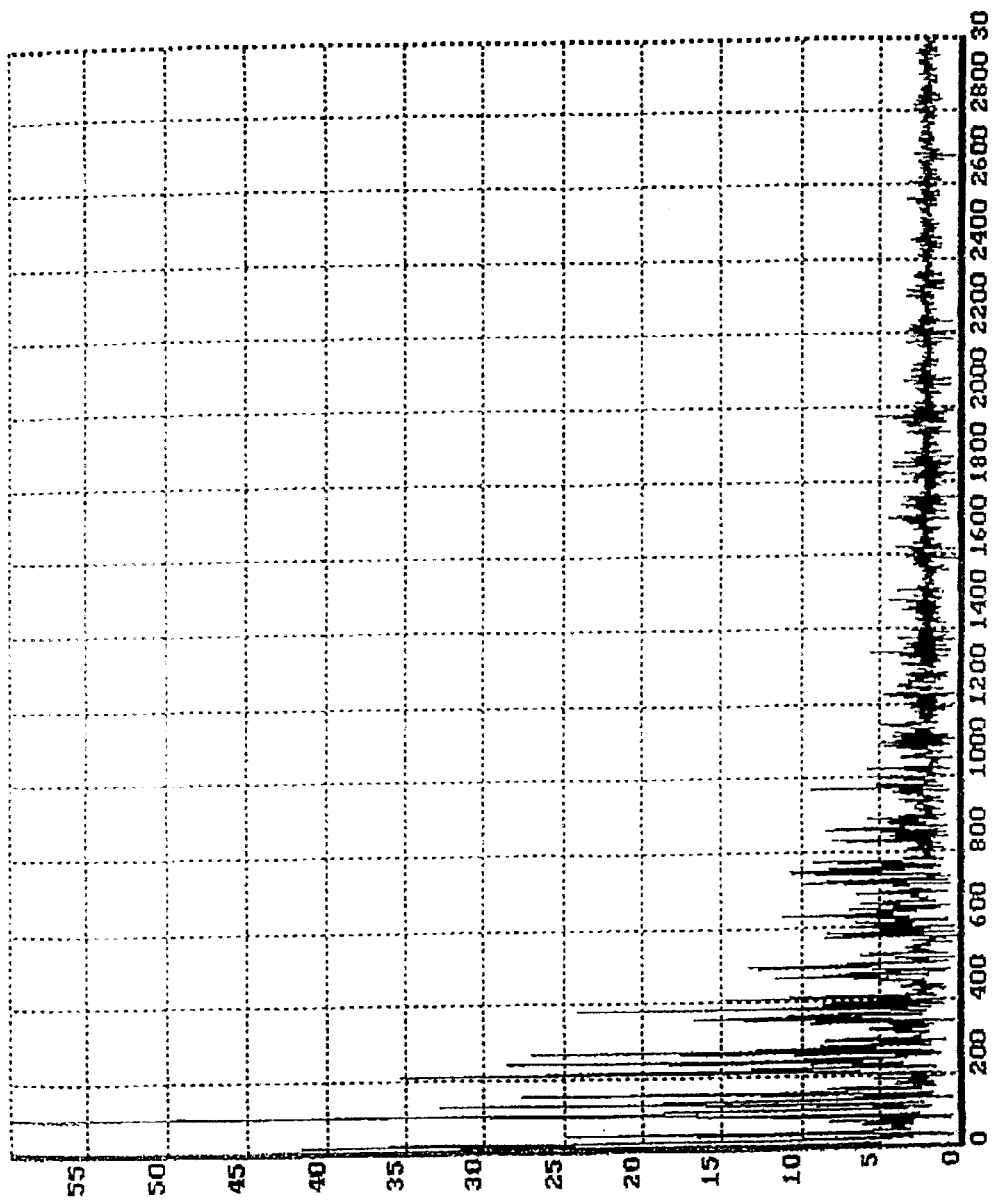
FIG. 2 is an acoustic noise spectrum of an electric arc furnace.

After extensive numerical experimentation, it was determined that the appropriate measure of temperature in a digital power spectrum such as the one illustrated in FIGS. 1 and 2 is the centroid frequency. A digital power spectrum is a record of power at discrete, equally spaced frequencies $f_i$, where i is an index that runs from 1 to an integer N that typically is an integral power of 2. (In the illustrated examples, N is 8192.) Let $P_i$ be the power measured at frequency $f_i$. The summed power, between a frequency $f_a$ and a frequency $f_b$, is $$\sum_{i=a}^{b} P_i$$

The centroid frequency $f_c$, is the frequency such that $$\sum_{i=1}^{c} P_i = \sum_{i=c}^{N} P_i \qquad (2)$$

For example, the centroid frequency of the spectrum in FIG. 1 is 771.93 Hz, and the centroid frequency of the spectrum in FIG. 2 is 874.42 Hz. In the case of FIG. 1, the summation was performed over the frequency range 250 Hz–2500 Hz. In the case of FIG. 2, the summation was performed over the frequency range 150 Hz–2500 Hz. It has been found by experience that acoustic noise at frequencies below 250 Hz in a blast oxygen furnace and below 150 Hz in an electric arc furnace are not related to the temperature of the furnace. The temperature of the furnace is given by $$T = \frac{(f_c L)^2}{KR} \qquad (3)$$

K and R are physical constants. L is determined from a suitable operating parameter of the furnace, using an empirical relationship among T, $f_c$ and the operating parameter that is established experimentally. In these calibration experiments, T is measured by conventional contact means, for example using thermocouples; and $f_c$ is measured as described above.

The operating parameter should be one that is causally connected to the generation of acoustic noise. In a blast oxygen steel furnace, the noise is generated by the supersonic jets of injected oxygen. RU 2,006,007 refers to the technical literature, specifically to A. V. Antsupov and V. G. Pimshtein, *Mechanics of Liquids and Gases*, USSR Academy of Sciences, 1975, for the method of estimating L from the rate of oxygen consumption. It will be appreciated that this method is not dependent on the fact that the injected gas is oxygen: a similar method may be used to estimate L from the rate of injection of an inert gas.

In an electric arc furnace the noise is produced by the interaction of the plasma arc with the melt. It has been found that a suitable associated operating parameter is the rate of electrical power consumption. The following table shows the raw data used to calibrate a particular electric arc furnace. T was measured using a thermocouple. The acoustic noise spectrum was measured and $f_c$ was determined as described the value appropriate for carbon monoxide, which is the dominant gas phase species in the furnace. Solving Equation (3) for L gives a relationship:

$$L = \frac{\sqrt{KRT}}{f_c} \qquad (4)$$

that provides an effective L that corresponds to these measurements. Simultaneously, the rate of electric power consumption W was measured.

| $F_c$(Hz) | W(kW/h) | T(° C.) | L(m) |
|---|---|---|---|
| 959 | 13430 | 1610 | 0.895 |
| 953 | 9935 | 1634 | 0.907 |
| 974 | 13620 | 1593 | 0.878 |
| 970 | 12670 | 1580 | 0.878 |
| 995 | 13340 | 1622 | 0.866 |
| 835 | 9323 | 1612 | 1.029 |
| 784 | 12320 | 1563 | 1.082 |
| 995 | 10665 | 1612 | 0.864 |
| 791 | 6308 | 1602 | 1.083 |
| 983 | 12612 | 1590 | 0.869 |
| 964 | 12603 | 1614 | 0.892 |
| 1005 | 8000 | 1574 | 0.846 |
| 1012 | 9260 | 1604 | 0.847 |
| 970 | 7680 | 1611 | 0.886 |
| 930 | 12823 | 1574 | 0.915 |
| 954 | 12300 | 1581 | 0.893 |
| 965 | 12013 | 1600 | 0.888 |

(Note that the temperature actually used in Equation (4) is in degrees Kelvin, not in degrees Celsius.) A least squares fit of L to W gives the following empirical relationship between L and W:

$$L = -9.61 \times 10^{-6} W + 1.019 \qquad (5)$$

Figure 3:
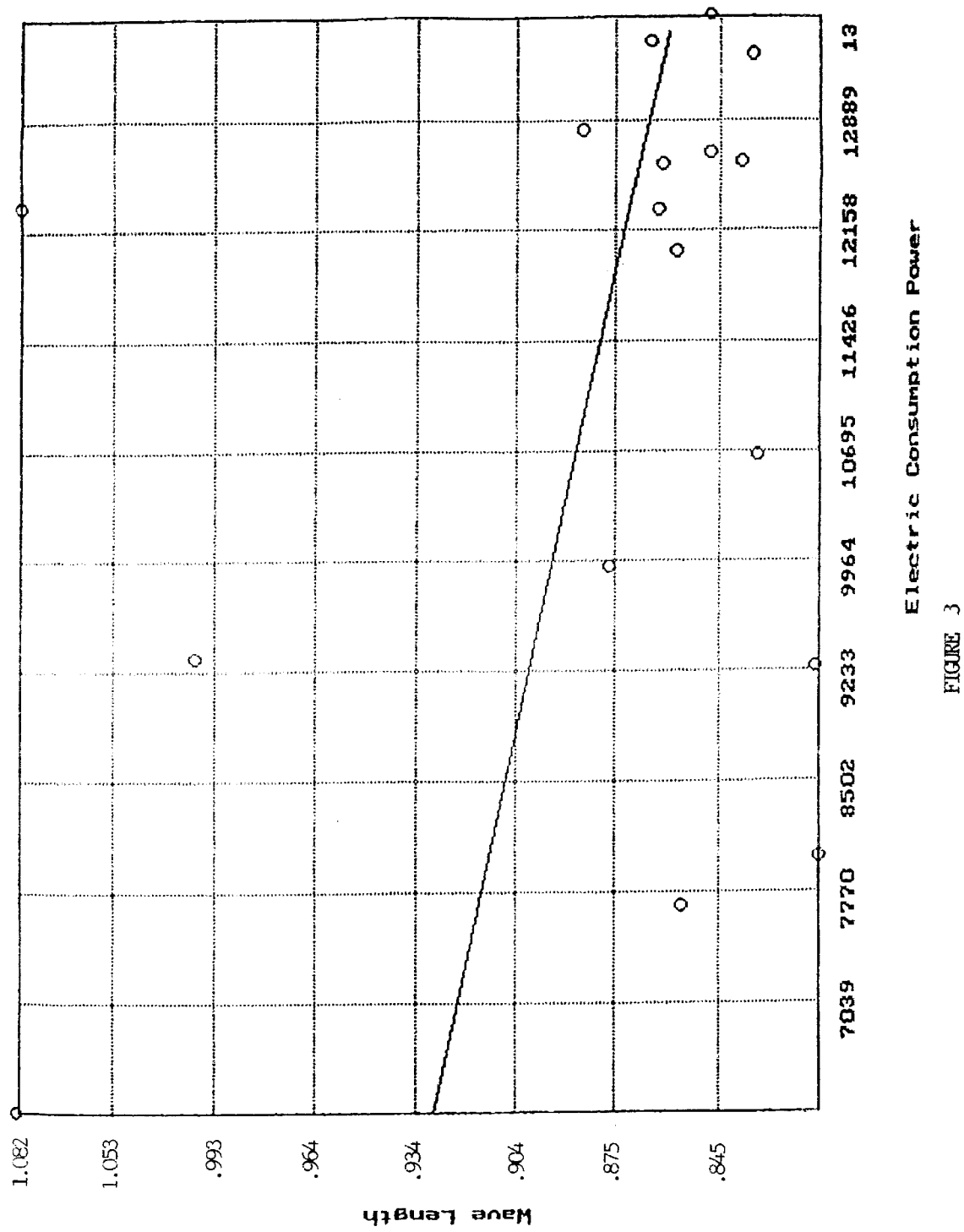
FIG. 3 is a plot of effective wavelength vs. power consumption in an electric arc furnace.

The data points and the least squares fit line are shown in FIG. 3. It will be appreciated that this empirical relationship is specific to the particular furnace on which the measurements were made. Each furnace must be calibrated individually.

Given an empirical relationship between L and W such as Equation (5), the temperature of the furnace is measured subsequently without using a thermocouple. The acoustic noise spectrum is measured and $f_c$ is determined as described above. Simultaneously, W is measured. L is inferred from W using the empirical relationship, and T is inferred from $f_c$ and L using Equation (3).

The least squares fit of L to W provides, in effect, an empirical two-parameter relationship among $f_c$, W and T:

$$T = \frac{f_c^2(aW+B)^2}{KR} \quad (6)$$

In general, according to the present invention, a functional relationship such as this one is established between temperature, a representative frequency of the acoustic noise spectrum, and an operating parameter that is causally connected with the generation of the noise. In practice, the three-parameter relationship $$T = \frac{f_c^2(aW+b)^2}{KR} + c \quad (7)$$

has been found to give even more accurate results. For the furnace that was the subject of the above two-parameter calculation, the three parameters are $a=-3.844\times10^{-6}$, $b=0.4076$ and $c=1344$.

While the invention has been described with respect to a limited number of embodiments, it will be appreciated that many variations, modifications and other applications of the invention may be made.

I claim:

1. A method of measuring a temperature of a metallurgical furnace, comprising the steps of:
   (a) establishing a relationship between a wavelength of acoustic noise in the furnace and a rate of consumption of electrical power by the furnace;
   (b) simultaneously:
      (i) recording a spectrum of said acoustic noise, and
      (ii) measuring said rate of consumption of electrical power;
   (c) computing a representative frequency of said acoustic noise from said spectrum; and
   (d) inferring the temperature, based on said representative frequency and on a wavelength inferred from said measured rate of consumption of electrical power using said relationship.

2. The method of claim 1, wherein said representative frequency is a centroid frequency of said spectrum.

3. A method of measuring a temperature of a metallurgical furnace, comprising the steps of:
   (a) establishing a relationship between the temperature, a frequency of acoustic noise in the furnace, and a rate of consumption of electrical power by the furnace;
   (b) simultaneously:
      (i) recording an acoustic noise spectrum of the furnace, and
      (ii) measuring said rate of consumption of electrical power;
   (c) computing a representative frequency of said acoustic noise from said spectrum; and
   (d) inferring the temperature from said representative frequency and said measured rate of consumption of electrical power, using said relationship.

4. The method of claim 3, wherein said representative frequency is a centroid frequency of said acoustic spectrum.

5. A method of measuring a temperature of a melt in a furnace including a source of acoustic noise having a temperature higher than the temperature of the melt, comprising the steps of:
   (a) simultaneously:
      (i) recording a spectrum of the acoustic noise, and
      (ii) measuring a rate of consumption of electrical power of the source;
   (b) computing a representative frequency of said spectrum; and
   (c) inferring the temperature of the melt from said representative frequency and said measured rate.

6. The method of claim 5, further comprising the step of:
   (d) determining an empirical dependence of the temperature of the melt on said rate and on said representative frequency;
   said inferring of the temperature of the melt being based on said dependence.

7. The method of claim 5, wherein said representative frequency is a centroid frequency of said spectrum.

* * * * *